METHOD OF MAKING AN INTEGRATED MAGNETIC MEMORY

Filed July 16, 1969 2 Sheets-Sheet 2

United States Patent Office 3,611,558

Patented Oct. 12, 1971

3,611,558

METHOD OF MAKING AN INTEGRATED MAGNETIC MEMORY

Michel Carbonel, Paris, France, assignor to Thomson-CSF

Filed July 16, 1969, Ser. No. 842,111
Claims priority, application France, July 25, 1968, 160,540
Int. Cl. H01f 7/06
U.S. Cl. 29—604 4 Claims

ABSTRACT OF THE DISCLOSURE

A method of manufacturing integrated magnetic circuits comprising: the deposition by electrolysis of a ferromagnetic material forming a memory core, on a filler metal, which is easily affected by chemical attack; a further deposition on said material of a further layer of the filler metal and the deposition of conductors on this latter layer; and the dissolving of the filler metal with substitution thereto of an insulating material.

The present invention relates to magnetic memories.

In integrated magnetic memories thin laminates of an alloy know as "permalloy" are generally used. This material is expensive, difficult to anneal, unable to be laminated in large widths, and it is difficult to reduce its thickness below 10 microns.

It is an object of this invention to avoid this drawback by providing permalloy layers by electrolytic deposition.

According to the invention, there is provided a method of manufacturing magnetic circuits comprising the following steps: forming a first layer of a filler metal easily attackable by a chemical agent; forming a hole in said layer; depositing by electrolysis a ferromagnetic material on said filler metal layer about said hole to form a magnetic core; depositing on said ferromagnetic material a further layer of filler metal; depositing at least one conductor made of a metal not easily attackable, said conductor extending on said further layer, through said hole and on said first mentioned layer; removing said filler metal; and substituting thereto an insulating material.

For a better understanding of the invention and to show how the same may be carried into effect reference will be made to the drawing accompanying the ensuing description and in which.

Figure 3:
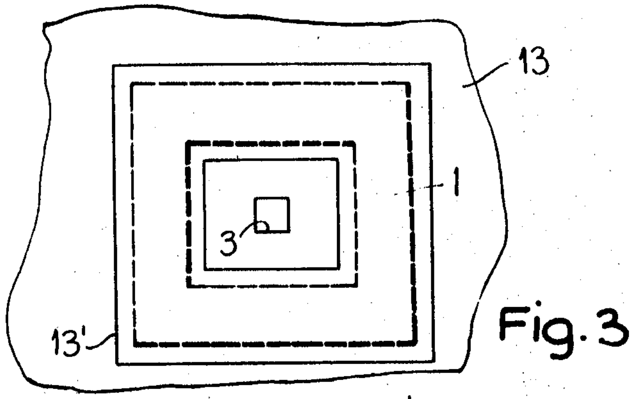
Figure 4:
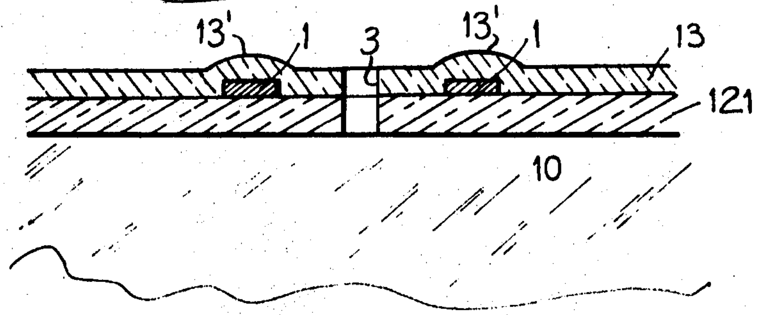
Figure 5:
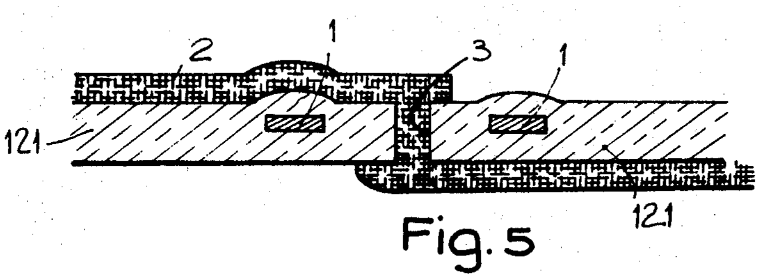
Figure 8:
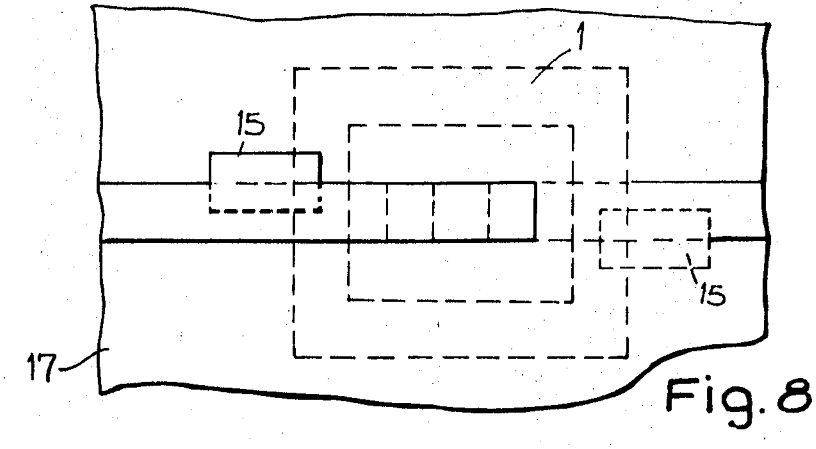
Figure 9:
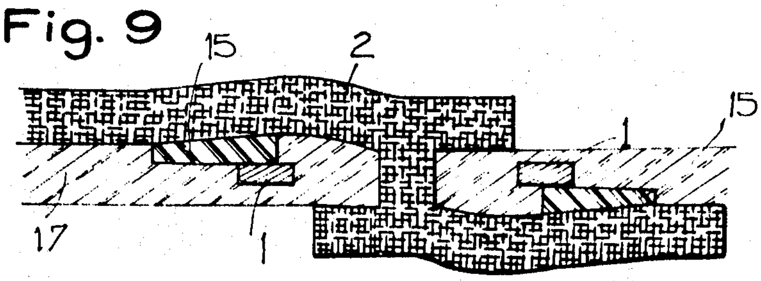
Figure 6:
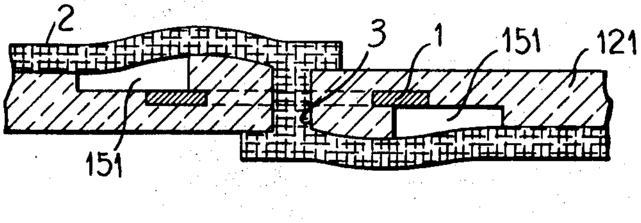
Figure 7:
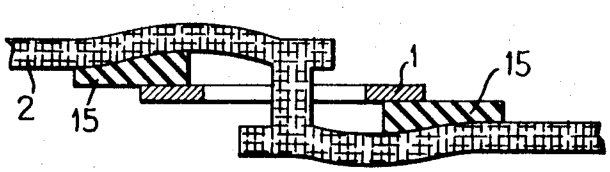

FIGS. 3 and 4 respectively illustrate plan and lateral sectional views of the same element after the second stage of the manufacturing process has been completed;

FIG. 5 illustrates the same element after the third manufacturing stage has been completed;

FIG. 6 illustrates the same element after the next manufacturing stage of dissolving the copper to insulate the conductors has progressed to the point of forming stud cavities;

FIG. 7 shows those cavities filled with photoresist and all the copper dissolved; and FIGS. 8 and 9 respectively illustrate in plan and in longitudinal section the element according to the invention.

In all the figures, similar reference numbers designate similar elements.

Figure 1:
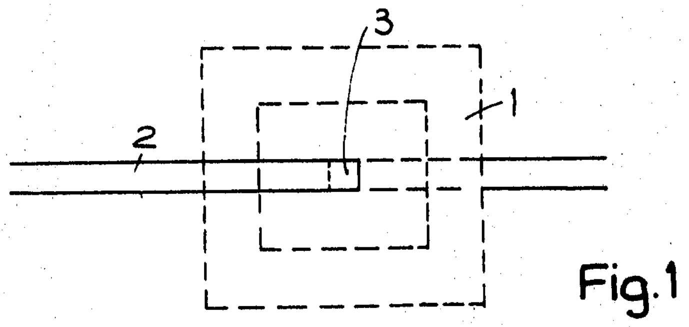
FIG. 1 is a diagrammatic plan view of a magnetic circuit.

In FIG. 1, a rectangular magnetic core 1 can be seen; it is made of permalloy and is encased in dielectric material.

A conductor 2 extends through hole 3 in the core, above one side thereof and below the other.

Figure 2:
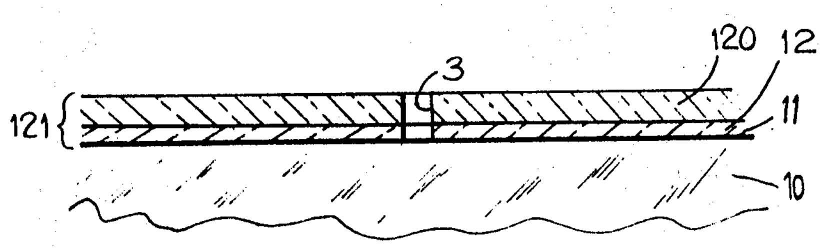
FIG. 2 is a transverse section of the element of the invention after the first stage of the manufacturing process has been completed.

FIG. 2 ilustrates a core according to the invention in the course of its manufacture. A glass plate 10 has been covered with a layer of varnish 11 upon which a thin copper layer 12 has been deposited by vaporization under vacuum. This copper layer has been covered by a layer of photosensitive resin or "photoresist." The assembly has been subsequently exposed to light using a suitable mask, in order to produce a hole 3 in the photoresist and copper assembly. The photoresist which is left, was then dissolved.

The thin copper layer 12 has then been increased by electrolysis, to a thickness of between 5 and 10/$\mu$ by the formation of a new copper layer 120. Copper is used as a filler.

This leaves a total copper layer 121 and, within it, a hole 3, the bottom of which is formed by the surface of the varnish.

On this layer, a fresh "photoresist" layer is deposited.

The assembly is exposed to the light using a suitable mask, in order to eliminate the photoresist at the area reserved for the core. Then, the permalloy layer is deposited at this area by electrolysis, in the form of the rectangular core 1 which can be seen in section and in plan, in FIGS. 4 and 3 respectively. Thereafter, the photoresist is dissolved and another copper layer 13 is deposited, covering layer 121, leaving hole 3 extending up through layer 13, and also covering the permalloy core 1 with a hump 13'.

The assembly 1, 121, 13 is sufficiently robust for it to be possible to remove it from the glass substrate by dissolving the varnish.

The result is an assembly having two exposed faces which are conductive.

The two faces are covered with a photoresist and a mask defining the conductor pattern is applied on the two faces of the photoresist. Then, the assembly is exposed. The part of of the photoresist, which is not protected by the mask, is removed, laying bare parts of the exposed faces. The conductors are then deposited by electrolysis in a gold bath. This produces the assembly shown in FIGS. 1 and 5.

The assembly comprises a copper layer 121 in which the permalloy 1 is embedded, and exhibits on its two faces the conductor 2, which passes through the wafer across the hole 3.

The next stage is to dissolve the copper in order to insulate the conductors from the core, whilst maintaining the robustness of the assembly. The assembly is again embedded in a photoresist. A mask is deposited over the photoresist. After exposure, the part of the photoresist which is not protected by the mask is dissolved and removed, laying bare the areas of the copper substrate near the points where the conductor intersects the periphery of the core. By photoengraving or etching by means of a product which attacks the copper, leaving the gold and permalloy intact, at these points a cavity 151 (FIG. 6) is formed between gold and permalloy in the copper substrate due to capillarity phenomenon, this cavity has a portion extending between conductor 2, and permealloy core. A fresh photoresist is deposited at these points to fill these cavities. As shown in FIG. 7 photoresist "studs" 15 which adhere to the gold and permalloy are thus formed.

Then, the remainder of the copper i.e., the portion of the copper layer 121 which was not submitted to the above mentioned photoengraving or etching process, is removed by a further selective chemical attack and replaced by an insulating layer 17 which penetrates by capillary action between the permalloy and the conductors; the result is the assembly shown in FIGS. 8 and 9.

The invention makes it possible to produce cores of very small size, due to the relatively easy positioning of the masks.

The same masks can be used to produce either slow memories, having permalloy thickness of 10μ, or fast memories where thin layers of 1μ or less are deposited.

Of course the invention is not limited to the embodiments described and shown which were given solely by way of example.

What is claimed is:

1. A method of manufacturing magnetic circuits comprising the following steps: forming a first layer of a filler metal easily attackable by a chemical agent; forming a hole in said layer; depositing by electrolysis a ferromagnetic material on said filler metal layer about said hole to form a magnetic core; depositing on said ferromagnetic material a further layer of filler metal; depositing at least one conductor made of a metal not easily attackable, said conductor extending on said further layer, through said hole and on said first mentioned layer; removing said filler metal; and substituting thereto an insulating material.

2. A method as claimed in claim 1, wherein the step of dissolving said filler metal, comprises dissolving said filler metal at the places where said conductor crosses said core to form cavities between said conductors and said core and filling said cavities with an insulating material prior to removing the remainder of said filler metal.

3. A method as claimed in claim 1, wherein said first layer is a thin layer formed on a support, said hole being formed in said first layer by a photoengraving technique.

4. A method as claimed in claim 1, wherein said conductor is of gold and said filler metal is copper.

References Cited

UNITED STATES PATENTS

| | | | |
|---|---|---|---|
| 2,942,240 | 6/1960 | Rajchman et al. | 340—174 |
| 3,407,492 | 10/1968 | Davis | 29—604 |
| 3,429,038 | 2/1969 | Dugan et al. | 29—625 |

JOHN F. CAMPBELL, Primary Examiner

C. E. HALL, Assistant Examiner

U.S. Cl. X.R.

29—625; 174—68.5; 340—174 MA, 174 JA, 174 TF